Oct. 8, 1929.  J. C. WILLIAMSON  1,730,707
STUMP PULLER
Filed June 14, 1927   2 Sheets-Sheet 1

Inventor
J.C.Williamson
By C.A.Snow & Co.
Attorneys.

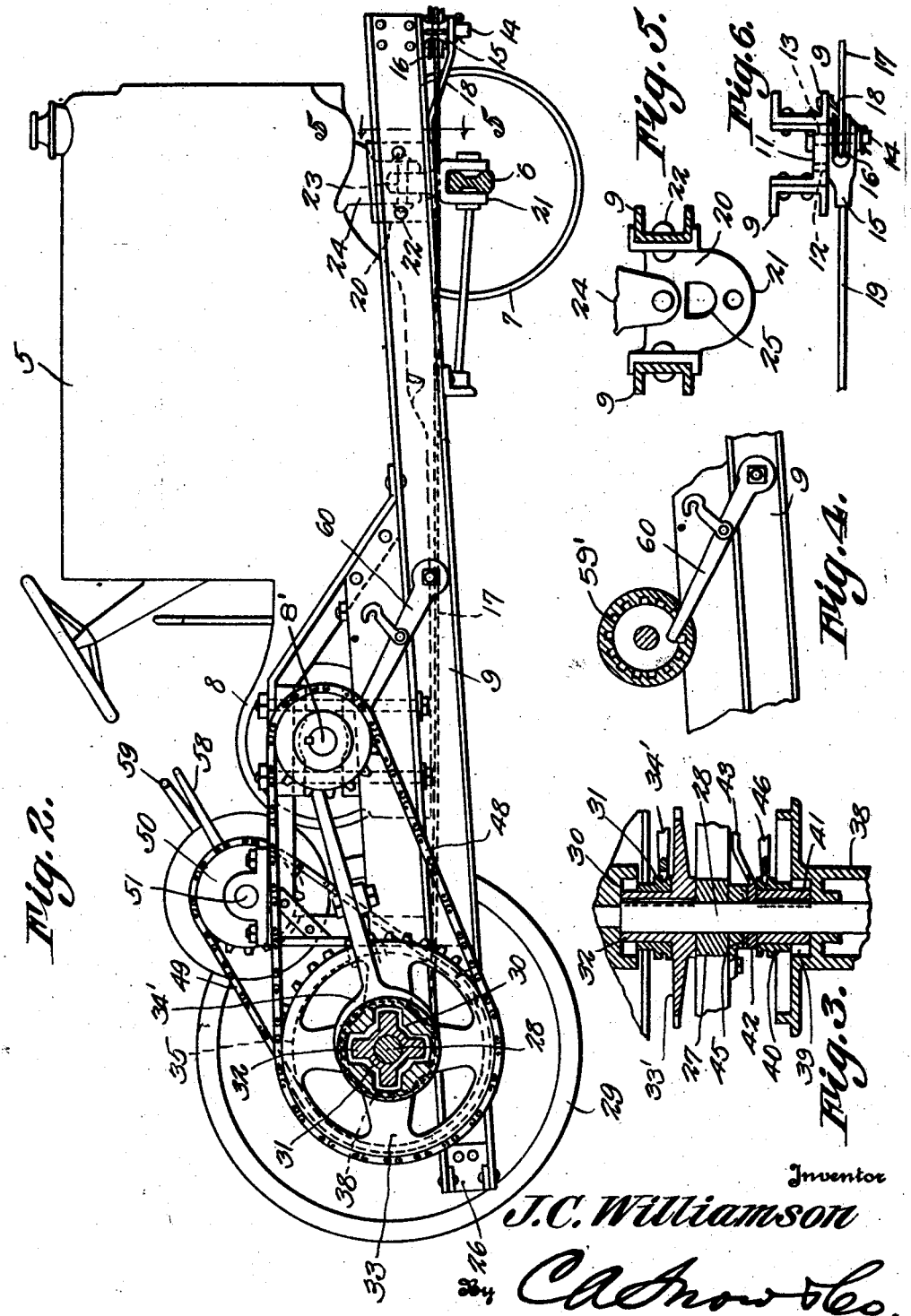

Patented Oct. 8, 1929

1,730,707

UNITED STATES PATENT OFFICE

JAMES C. WILLIAMSON, OF CORDELE, GEORGIA, ASSIGNOR TO ROSS-MEEHAN FOUNDRIES, OF CHATTANOOGA, TENNESSEE

STUMP PULLER

Application filed June 14, 1927. Serial No. 198,778.

This invention relates to stump pullers and more particularly to stump pullers of the portable type, the primary object of the invention being to provide an attachment which may be mounted on the usual tractor structure and supported by the front axle and rear axle housing thereof.

Another object of the invention is to provide a novel form of drive so constructed that the drive axle of the tractor may be employed for driving the winding drum of the stump puller without destroying the portability or draw bar service of the tractor, and providing a stump puller of the self-propelled type, eliminating the use of skids or the like.

A still further object of the invention is the provision of a driving mechanism designed to convert the usual three speed tractor into a six speed unit, to the end that the drums of the attachment may be rapidly rotated for various reasons, for example, taking up slack in the power cable, or for light work in skidding logs.

Another important object of the invention is to provide means for guiding the power cable so that the tractor will be anchored and caused to automatically align itself with its work, should the power cable and anchor cable be out of alignment with the tractor when the winding drum is set in motion.

Still another object of the invention is to provide means for elevating the tractor so that the flanges of the power drum will operate in proper spaced relation with the ground surface to insure against the drum being retarded in its operation by contact with the ground surface on which the stump puller is operating.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a side elevational view of the device, parts thereof being shown in section.

Figure 3 is a fragmental sectional view illustrating one end of the power drum and showing the clutching mechanism.

Figure 4 is a sectional view taken on line 4—4 of Figure 1.

Figure 5 is a sectional view taken on line 5—5 of Figure 2.

Figure 6 is a front elevational view of the attachment.

Figure 1:
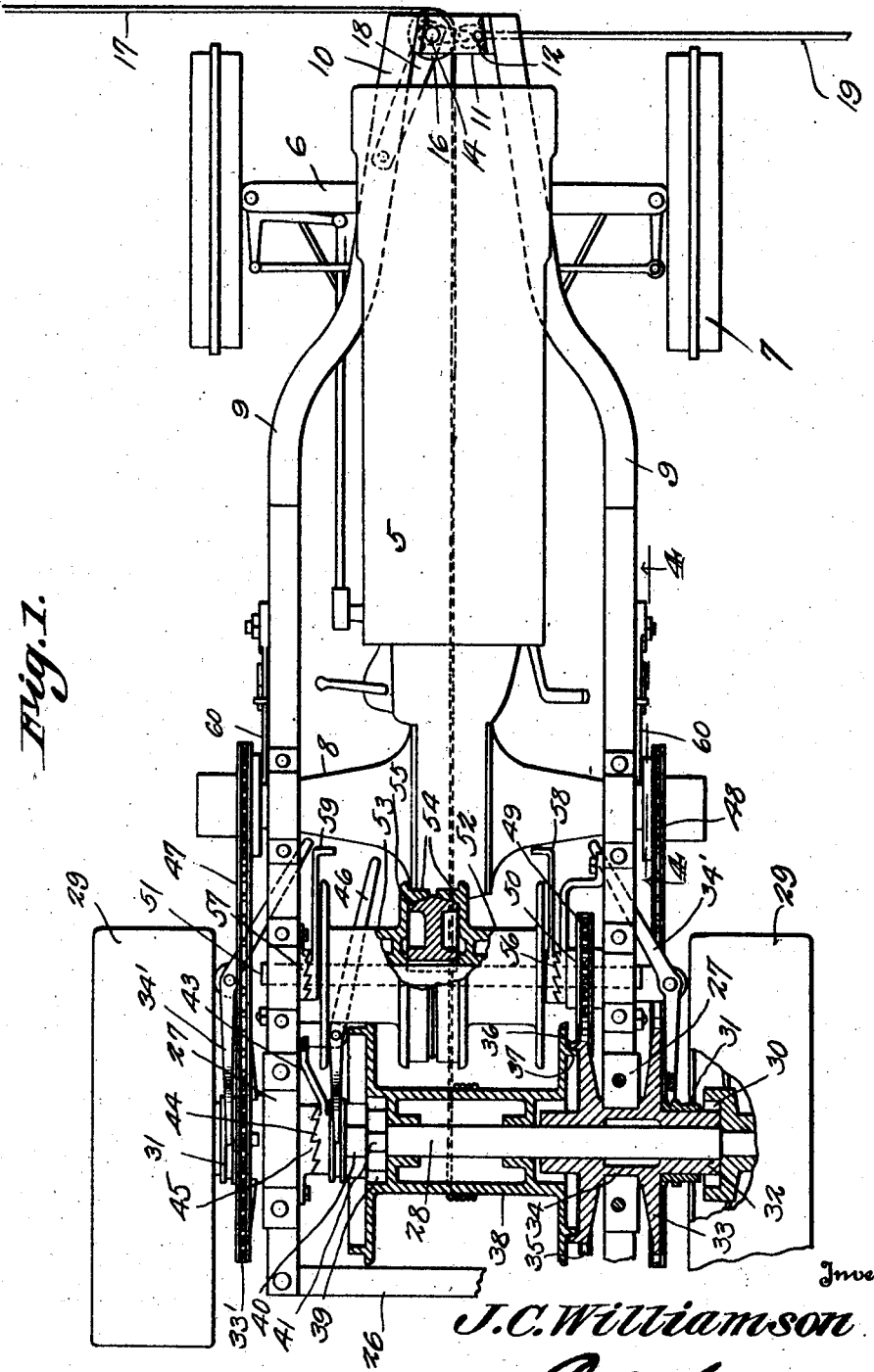
Figure 1 is a plan view of a tractor, equipped with an attachment constructed in accordance with the invention, the parts thereof being shown in section.

Referring to the drawings in detail, the reference character 5 indicates generally a tractor which is of the usual construction, the same being supplied with the usual front axle 6, front wheels 7, and a rear axle 8' operated by the usual differential housed within the housing 8.

The stump puller forming the essence of the present invention embodies an elongated frame including side bars 9 converging towards the forward end of the tractor as at 10, where they are connected with the channel iron 11, as clearly shown by Figure 6 of the drawings.

This channel iron 11 is formed with openings 12 and 13 to receive the securing bolt 14 that secures the clevis 15 to the channel iron, the bolt 14 also acting as a bearing for the guide pulley 16 over which the power cable 17 operates.

The reference character 18 designates a bracing arm that connects with one of the side bars, the free end thereof being supplied with an opening, through which the bolt 14 passes to rigidly secure the clevis 15 and guide pulley supported thereby. Due to this construction it will be seen that the bolt 14 may be withdrawn from the opening in which it is positioned in the channel iron 11 and positioned in the opening 12 to reverse the clevis 15 when it is desired to operate the power cable from the opposite direction.

Connected with the clevis 15 is an anchor cable 19 that has one of its ends supplied with suitable means whereby the anchor cable may be secured to an anchor stump.

Mounted between the side bars 9 at a point adjacent to the forward end of the attachment, is a securing member 20 that has spaced downwardly extended portions 21 adapted to straddle the front axle 6 of the tractor, as shown by Figure 2 of the drawings. This member 20 is secured to the side bars 9 by means of rivets 22 and is provided with an opening to receive the bolt 23 that also passes through the support 24 forming a part of the usual tractor construction. Thus it will be seen that due to this construction, the forward portion of the tractor is elevated in such a way that the power cable 17 which operates over the guide pulley 16 may be operated in a direct line. An opening 25 is formed in the member 20 through which the power cable 17 operates.

As shown, the rear ends of the side bars 9 are connected as by means of the transverse bar 26, the side bars 9 being also provided with bearings 27 in which the axle 28 is mounted, the axle extending beyond the side bars to support the power wheels 29.

The power wheels 29 are supplied with clutch faces 30 formed on the inner surfaces of the hubs thereof, which clutch faces are adapted to be engaged by the clutch members 31 operated at opposite sides of the machine, and which are splined on the hubs 32 of the sprockets 33 and 33', there being provided clutch operating members 34' connected with the clutch members to operate the clutch members as described.

The hub 32 of the sprocket 33 is provided with an extension 34 on which the sprocket wheel 35 is integrally formed, the sprocket wheel 35 being also provided with a clutch face 36 of the friction type that contacts with the clutch 37 of the power drum 38.

Forming a part of the power drum 38 is the clutch member 39 that is engaged by the clutch member 40 that is splined on the sleeve 41 which in turn is splined on the shaft 28. Contacting with one end of the sleeve 41 is a head 42 that has connection with the arm 43 so that as the arm 43 is moved vertically, the head is moved towards the drum 38, forcing the sleeve 41 against the drum 38 on the shaft 28 which movement causes the clutch members 36 and 37 to be engaged, to the end that movement of the sprocket 33 is transmitted to the drum to rotate the drum.

Cam faces 44 are provided on the head 42 and contact with the cam faces 45 so that as the arm 43 is moved vertically, the cam faces will be moved with respect to each other to cause the sliding movement of the sleeve 41 and power drum. The reference character 46 indicates the lever that connects with the clutch 40, so that the clutch 40 may be operated to move the same into engagement with the clutch member 39 should it be desired to clutch this end of the drum to the axle 28.

The sprocket 33' is keyed to the axle 28 and receives motion from one end of the usual drive axle operated by the usual differential through the chain 47, while movement of the opposite end of the drive axle is imparted to the sprocket 33 through the chain 48, the sprocket 33 being loosely mounted on the axle 28.

A chain indicated at 49 operates over the sprocket wheel 35 and also operates over the sprocket wheel 50 keyed to the auxiliary supporting shaft 51 on which the drums 52 and 53 are loosely mounted. The drums 52 and 53 are provided with clutch faces 54 that engage the clutch member 55 that is also keyed to the shaft 51 at a point intermediate the ends of the shaft so that as the drums 52 and 53 are moved to engage the clutch member 55, the drums will be rotated with the shaft 51.

The drums 52 and 53 are moved laterally by means of the cam faces 56 and 57 that cooperate with stationary cam faces of a like construction, the cam faces 56 and 57 being moved by means of the levers 58 and 59 respectively.

Mounted adjacent to the ends of the drive shaft are gears having internal teeth 59', which teeth are adapted to be engaged by means of the pivoted arms 60 located at opposite sides of the frame so that either end of the drive axle may be held stationary to cause the opposite end of the drive axle to spin at a greater rate of speed so that the power cable may be wound rapidly on its drum as is necessary in the taking up of slack.

From the foregoing it will be seen that due to this construction, direct power may be taken off from the drive axle operated by the usual differential and transmitted to both ends of the power drum simultaneously, causing the power drum to operate at a comparatively low rate of speed, however should it be desired to operate the drum at a greater rate of speed it is only necessary as before stated, to lock one end of the drive axle as by means of the arms 60, and release the opposite end of the drum, whereupon the opposite end of the drive axle is rotated rapidly through the differential gearing.

The drums 52 and 53 may also be operated in a like manner.

It will be seen that due to this construction, I have provided a portable machine, which may be readily moved under its own power and on its supporting wheels from place to place, and by merely operating a hand lever, the supporting wheels may be thrown out of operation and the power directed to a winding drum to accomplish various purposes.

It will also be seen that when the power cable is being wound on its drum, a direct pull will be exerted on the power cable, to the end that should the tractor be slightly out of alignment with its work, the tractor will be automatically moved to its proper position aligning it with its work.

I claim:

1. In combination with a differential shaft of a tractor, of an auxiliary shaft, a drum loosely mounted on the auxiliary shaft, power wheels mounted on the auxiliary shaft, a shaft associated with the auxiliary shaft, drums on the latter shaft, and means for transmitting movement from both ends of the differential shaft to the drums or power wheels, means for locking the driving means at one end of the differential shaft against movement to cause the opposite end to rotate at double speed to drive the drums at double speed.

2. In combination with a tractor, an auxiliary frame secured under the tractor, a supporting member adapted to be secured to the front axle of the tractor and resting on the front axle of the tractor to elevate the tractor, a drum shaft mounted on the auxiliary frame and disposed in a plane below the differential of the tractor, power wheels mounted on the drum shaft, clutching means for transmitting power from the differential to the drum shaft, and clutching means for transmitting power to the power wheels independently of the drum shaft.

3. In combination with a tractor having a differential shaft and having a front axle, an auxiliary frame, a securing member secured to the frame and having downwardly extended portions adapted to straddle the axle, means for connecting the securing member to the tractor, said securing member having an opening through which a cable may pass, an auxiliary shaft mounted adjacent to the differential shaft, a drum mounted on the auxiliary shaft, means for transmitting power from the differential to the drum, and supporting wheels on the auxiliary shaft.

In testimony that I claim the foregoing as my own, I have hereto affixed my signature.

JAMES C. WILLIAMSON.